United States Patent
Seo

(10) Patent No.: US 12,504,716 B2
(45) Date of Patent: Dec. 23, 2025

(54) CODING METHOD FOR COMPRESSING COMPLEX HOLOGRAM

(71) Applicant: Kwangwoon University Industry-Academic Collaboration Foundation, Seoul (KR)

(72) Inventor: Young Ho Seo, Seoul (KR)

(73) Assignee: Kwangwoon University Industry-Academic Collaboration Foundation, Seoul (KR)

(*) Notice: Subject to any disclaimer, the term of this patent is extended or adjusted under 35 U.S.C. 154(b) by 568 days.

(21) Appl. No.: 17/965,218

(22) Filed: Oct. 13, 2022

(65) Prior Publication Data
US 2023/0168627 A1   Jun. 1, 2023

(30) Foreign Application Priority Data

Nov. 26, 2021  (KR) .................. 10-2021-0166202
Jul. 7, 2022   (KR) .................. 10-2022-0083642

(51) Int. Cl.
G03H 1/08    (2006.01)
H04N 19/187  (2014.01)

(52) U.S. Cl.
CPC ......... G03H 1/0841 (2013.01); H04N 19/187 (2014.11)

(58) Field of Classification Search
CPC .......................... G03H 1/0841; H04N 19/187
See application file for complete search history.

(56) References Cited

U.S. PATENT DOCUMENTS

| | | | |
|---|---|---|---|
| 7,446,915 B2* | 11/2008 | Holmes ............... | G02B 5/0268 |
| | | | 359/900 |
| 9,594,461 B1* | 3/2017 | Daniel .................... | G06F 3/017 |
| 2003/0133174 A1* | 7/2003 | Salehi ................... | H04J 14/005 |
| | | | 359/15 |
| 2004/0201873 A1* | 10/2004 | Erickson ............. | G11B 23/283 |

(Continued)

FOREIGN PATENT DOCUMENTS

| | | | |
|---|---|---|---|
| EP | 2168015 | * | 5/2008 |
| KR | 10-2015-0031523 A | | 3/2015 |

(Continued)

OTHER PUBLICATIONS

T. J. Naughton, Y. Frauel, B. Javidi and E. Tajahuerce, "Compression of digital holograms for three-dimensional object reconstruction and recognition", Appl. Opt. 41, pp. 4124-4132, Jul. 2002.

(Continued)

*Primary Examiner* — Zaihan Jiang
(74) *Attorney, Agent, or Firm* — NKL LAW; Jae Youn Kim

(57) ABSTRACT

Provided is a coding method for compressing a complex hologram, in which the coding method includes: (b) creating a complex vector plane divided into unit regions, and giving an index to each unit region of the complex vector plane; (c) projecting the complex hologram to the complex vector plane by regarding the complex hologram as a complex vector, and assigning the index given to the unit region of the projected complex vector plane as a complex index of the complex hologram; and (f) encoding the complex hologram assigned with the complex index. According to the method described above, the full-complex hologram is reconstructed into one piece of index information using the complex vector plane to code the full-complex hologram, such that the hologram can be efficiently compressed while preserving a relationship between a real hologram and an imaginary hologram.

13 Claims, 14 Drawing Sheets

(56) References Cited

U.S. PATENT DOCUMENTS

| | | | | |
|---|---|---|---|---|
| 2006/0139711 | A1* | 6/2006 | Leister | G03H 1/2294 |
| | | | | 359/9 |
| 2007/0047042 | A1* | 3/2007 | Noguchi | G11C 13/042 |
| | | | | 359/24 |
| 2010/0157399 | A1* | 6/2010 | Kroll | G03H 1/02 |
| | | | | 359/11 |
| 2015/0201186 | A1* | 7/2015 | Smithwick | H04N 13/363 |
| | | | | 348/52 |
| 2018/0364481 | A1* | 12/2018 | Robbins | G02F 1/133528 |
| 2019/0362556 | A1* | 11/2019 | Ben-Dor | G06F 3/167 |
| 2020/0375666 | A1* | 12/2020 | Murphy | G06T 19/006 |
| 2021/0165212 | A1* | 6/2021 | Christmas | G03H 1/2249 |
| 2021/0201950 | A1* | 7/2021 | Zheng | G11B 7/083 |

FOREIGN PATENT DOCUMENTS

| | | |
|---|---|---|
| KR | 10-2015-0031524 A | 3/2015 |
| KR | 10-2021-0094990 A | 7/2021 |

OTHER PUBLICATIONS

T. J. Naughton, Y. Frauel, O. Matoba, N. Bertaux, E. Tajahuerce and B. Javidi, "Three-dimensional imaging, compression, and reconstruction of digital holograms", SPIE Proc, vol. 4877, Opp.104-114, Mar. 2003.

H. Yoshikawa and K. Sasaki, "Image Scaling for electro-holographic display", editor, SPIE Proc, vol. 2176 Practical Holography VIII, paper#2176-02, pp. 12-22, Feb. 1994.

P. A. Cheremkhin, and E. A. Kurbatova, "Numerical comparison of scalar and vector methods of digital hologram compression." Holography, Diffractive Optics, and Applications VII. vol. 10022, No. 1002227, pp. 1-10, Oct. 2016.

A. Ahar, D. Blinder, R. Bruylants, C. Schretter, A. Munteanu, and P. Schelkens, "Subjective quality assessment of numerically reconstructed compressed holograms." In Applications of Digital Image Processing XXXVIII. International Society for Optics and Photonics. vol. 9599, No. 95990K, pp. 1-15, Sep. 2015.

\* cited by examiner (a)          (b)

(c)          (d)

FIG. 7
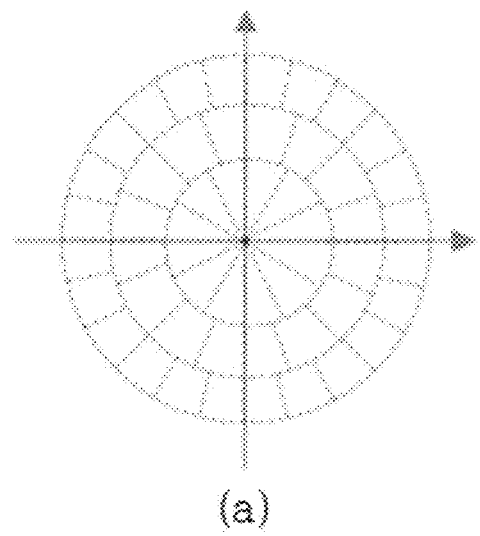
(a)
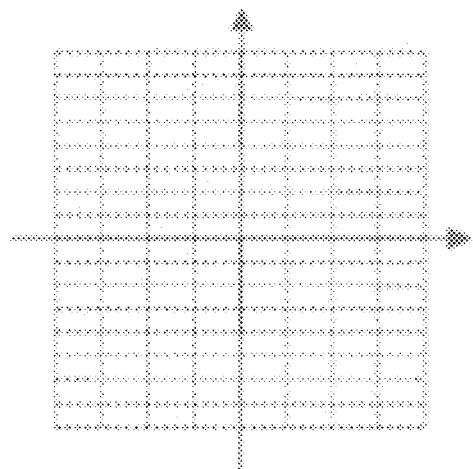
(b)
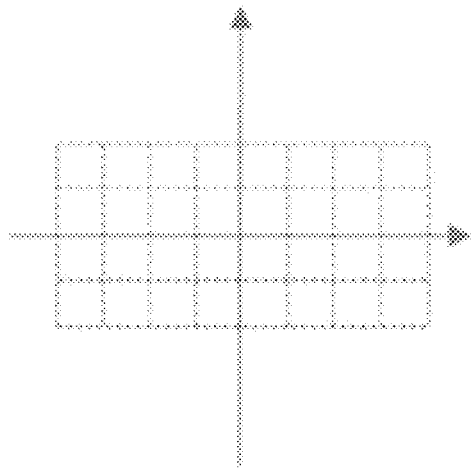
(c)

FIG. 10a

Distortion Optimization:

Process: $H_C(x,y) \xrightarrow[Q(H_C,C)]{} I(x,y) \xrightarrow[Q^{-1}(I,C^{-1})]{} H_C'(x,y)$ Step1: complex index plane: $I(u,v) = Q(H_C(x,y), C(\theta))$ Step2: $H_C'(x,y) = Q^{-1}(I(u,v), C^{-1}(\theta))$ Step3: loss function: $L(\theta) = H_C(x,y) - H_C'(x,y)$ Step4: loss analysis for stopping optimization Step5: slop calculation of Loss function: $S = \frac{\partial L(\theta)}{\partial \theta}$ Step6: hyper parameter update for optimization: $\theta' = \theta + \alpha \frac{\partial L(\theta)}{\partial \theta}$ Step7: $\theta = \theta'$ Step8: go to Step1

FIG. 10b

Distortion Optimization:

Process: $H_{AP}(x,y) \xrightarrow[Q(H_{AP},C)]{} I(x,y) \xrightarrow[Q^{-1}(I,C^{-1})]{} H_{AP}'(x,y)$ Step1: complex index plane: $I(u,v) = Q(H_{AP}(x,y), C)$ Step2: $H_{AP}'(x,y) = Q^{-1}(I(u,v), C^{-1})$ Step3: loss function: $L(\theta) = H_{AP}(x,y) - H_{AP}'(x,y)$ Step4: loss analysis for stopping optimization Step5: slope calculation of loss function: $S = \frac{\partial L(\theta)}{\partial \theta}$ Step6: hyper parameter update for optimization: $\theta' = \theta + \alpha \frac{\partial L(\theta)}{\partial \theta}$ Step6: $\theta = \theta'$ Step7: go to Step1

(a)

(b)

CODING METHOD FOR COMPRESSING COMPLEX HOLOGRAM

BACKGROUND OF THE INVENTION

1. Field of the Invention

The present invention relates to a coding method for compressing a complex hologram by reconstructing a full-complex hologram into one piece of information using a complex vector plane to code the full-complex hologram and dividing the complex vector plane into a plurality of unit regions to transform hologram pixels in the form of a real number into indexes in the form of an integer.

2. Description of the Related Art

The holography was first proposed by Gabor in 1948 and has been researched and developed in many fields because of its ability to fully record three-dimensional (3D) information. The analog holography, which is used by recording the 3D information on a hologram film made of a specific material and developing the film, is a somewhat limited technology for use in modern multimedia services.

Recently, studies on a digital hologram technology have been widely conducted to fully utilize 3D recovery of holograms while overcoming disadvantages of analog methods. In order to use a digital hologram as multimedia, a digital hologram signal processing technology is required. The hologram signal processing largely includes hologram rendering and compression. The hologram rendering technology may include hologram creation, edition, display, interpolation, and enhancement. The hologram compression technology includes stationary hologram compression and video hologram compression.

The easiest and simplest hologram compression method to be applied may be a lossless coding method. In the previous studies, various attempts were made to compress the hologram by the lossless coding method [Non-Patent Documents 1 and 2].

A hologram in the form of a complex number, which is expressed in a floating-point format, may be expressed as a pair of a real (RE) number and an imaginary (IM) number cr a pair of an amplitude (AM) or a phase (PH). Since these pairs display the same information but have different characteristics, an effect on compression of the hologram may be different. Regarding the previous study results, the pair of AM/PH did not affect the hologram, and the pair of RE/IM showed a compression ratio of about 3:1 to 4:1 [Non-Patent Document 1].

The compression method using hologram resampling was also attempted [Non-Patent Document 3]. The classical form of the previous resampling studies has been mainly conducted before [Non-Patent Document 1], and because the compression ratio is low, few study results have been published recently. Regarding the study results, a case of using bilinear interpolation showed the best result on average, followed by a case of using bicubic interpolation, and finally, a case of using nearest neighborhood interpolation [Non-Patent Document 1].

Studies on analyzing an effect of quantization on holograms can be seen in several study cases so far. Previously, uniform quantizers have been mainly used, and scalar quantization, which was considered in units of hologram pixels, was mainly considered [Non-Patent Document 1]. Recently, studies on vector quantization that performs quantization in block units are also being conducted [Non-Patent Document 4]. Moreover, scalar quantization and a uniform quantizer as well as a non-uniform quantizer are also being studied</Underline>. Regarding the study results using a normalized standard deviation (NSTD), the uniform quantizer showed a good performance in case of assigning the low quantization bits (high compression), and K-means clustering method showed a good performance in case of assigning the high quantization bits (low compression). However, the difference is very small. In general, the K-means clustering method showed a poor performance for all quantization bits. The results of this study show that vector quantizers with high computational complexity and a complex algorithm do not necessarily show good performance for quantization of holograms.

Recently, various studies have been conducted to compress holograms mainly using standard such codecs as joint photographic experts group (JPEG), JPEG2000, advance video coding (AVC), and high efficiency video coding (HEVC), and benchmark a compression efficiency between the standard codecs. There are several common considerations in a method of using the standard codecs. The first is to transform the complex hologram in a floating-point format into an 8-bit integer data. The second is to adjust a parameter of the codec. Each codec has various parameters that may be adjusted. For example, when the HEVC uses an Intra mode, sizes of a quantization parameter (QP) and a coding unit (CJ), etc. may be selected. In this way, a difference may occur in some results due to a difference in settings of preferred parameters.

A study on the hologram compression may be largely divided into a method of compressing the hologram itself and a method of propagating the hologram to a specific distance and then compressing information on a diffracted (recovered) plane at the position. Most of the methods discussed so far have been attempted to compress the hologram itself. Because the hologram has a shape similar to that of noise, it is difficult to find a spatial correlation between the pixels, such that it is difficult to show good energy concentration even if frequency transformation is performed. Therefore, the compression method in the recovered region is to compress the hologram after transforming the hologram into a form of data having a higher spatial correlation.

The present invention limits the discussion to the study of compressing the hologram itself.

Holograms are represented in various ways. When the hologram was photographed using a charge-coupled device (CCD) in an optical manner, the hologram corresponds to an intensity-based hologram, and when the hologram corresponds to a phase-shifted hologram, a difference between each hologram (phase-shifted distances-based representation) is used for compression.

The most common hologram is represented as complex waves (complex object wavefield-based representation). The complex waves may be represented as a real number and an imaginary number or as an amplitude and a phase. When information on the same hologram is represented by different representation methods, the result of the compression may be different. In general, the real and imaginary representations show better compression efficiency than the pair of the amplitude and the phase. This is because a phase component has too strong randomness and compression efficiency is very low. Therefore, most previous studies prefer to compress real and imaginary information.

That is, a full-complex hologram method is a method that is most commonly used among various methods for representing the hologram. The full-complex hologram method may mathematically and perfectly represent interference and diffraction phenomena of light propagating in a space. The full-complex hologram is represented in the form of a real number, and many bits are thus required to represent one hologram pixel. A two-dimensional (2D) image is stored in the form of an integer, so that the number of bits is relatively small, whereas the hologram is stored in the form of a real number, so that many bits are required to represent a number below a decimal point. In addition, the full-complex hologram has a floating-point format, so that the real (or and imaginary parts amplitude and phase) exist simultaneously. Therefore, a plane having pixels twice the 2D image is required. When the 2D image is an 8-bit full HD frame, the hologram requires two 32-bit full HD frames at the same resolution. Considering the number of bits, the hologram uses eight times as many bits as the 2D image.

When visually observed, the hologram is data that is very difficult to compress because it has a shape similar to that of noise. Not only an image quality of each of the real part and the imaginary part (or amplitude and phase) is important, but also preservation of a relationship between the real part and the imaginary part (or amplitude and phase) is also very important. That is, the holograms of the real part and the imaginary part (or amplitude and phase) need to be well compressed while preserving the relationship between the real part and the imaginary part (or amplitude and phase).

Therefore, a technology capable of efficiently compressing the hologram while preserving the relationship between the holograms of the real part and the imaginary part (or amplitude and phase) is required.

RELATED ART DOCUMENT

Non-Patent Documents (Non-Patent Document 1) J. Naughton, Y. Frauel, B. Javidi and E. Tajahuerce, "Compression of digital holograms for three-dimensional object reconstruction and recognition", Appl. Opt. 41, pp. 4124-4132 July 2002.

(Non-Patent Document 2) T. J. Naughton, Y. Frauel, O. Matoba, N. Bertaux, E. Tajahuerce and B. Javidi, "Three-dimensional imaging, compression, and reconstruction of digital holograms", SPIE Proc, vol. 4877, Opp. 104-114, March 2003.

(Non-Patent Document 3) H. Yoshikawa and K. Sasaki, "Image Scaling for electro-holographic display", editor, SPIE Proc, vol. 2176 Practical Holography VIII, paper #2176-02, pp. 12-22, February 1994.

(Non-Patent Document 4) P. A. Cheremkhin, and E. A. Kurbatova, "Numerical comparison of scalar and vector methods of digital hologram compression." Holography, Diffractive Optics, and Applications VII. vol. 10022, no. 1002227, pp. 1-10, October 2016

SUMMARY OF THE INVENTION

In order to solve the problem described above, the present invention is to provide a coding method for compressing a complex hologram by reconstructing a full-complex hologram into one piece of information using a complex vector plane to code the full-complex hologram and dividing the complex vector plane into a plurality of unit regions to transform hologram pixels in the form of a real number into indexes in the form of an integer through a quantization process.

In addition, an object of the present invention is to provide a coding method for compressing a complex hologram by performing an optimization process for finding a complex vector plane that may best represent the complex hologram, performing optimization by giving an index only to a unit region used in the complex vector plane, and then coding the complex hologram using a conventional image compression tool.

In order to achieve the object, the present invention relates to a coding method for compressing a complex hologram, and the coding method includes: (b) creating a complex vector plane divided into unit regions, and giving an index to each unit region of the complex vector plane; (c) projecting the complex hologram to the complex vector plane by regarding the complex hologram as a complex vector, and assigning the index given to the unit region of the projected complex vector plane as a complex index of the complex hologram; and (f) encoding the complex hologram assigned with the complex index.

In addition, the coding method for compressing a complex hologram of the present invention may further include: (a) performing the steps from step (b) after normalizing the complex hologram, in which the complex hologram is normalized by clipping a predetermined region and projecting the clipped region into a range having a predetermined size.

In addition, in the coding method for compressing a complex hologram of the present invention, in step (a), when the clipped region is projected into the range having the predetermined size, a scaling operation may be further performed for adjusting a distribution of a hologram.

In addition, in the coding method for compressing a complex hologram of the present invention, in step (b), the index may be given to each unit region of the complex vector plane as numbers that are distinguished from each other.

In addition, in the coding method for compressing a complex hologram of the present invention, in step (b), the index may be given to each unit region of the complex vector plane as a series of numbers in each unit region.

In addition, the coding method for compressing a complex hologram of the present invention may further include: (d) repeating steps (b) and (c) by recovering the complex hologram from the assigned complex index of the complex hologram in step (c) and adjusting a hyper parameter to minimize a difference (hereinafter, a loss) between an original complex hologram and the recovered complex hologram, in which the hyper parameter is a variable that adjusts at least one of a size and a shape of the unit region of the complex vector plane.

In addition, the coding method for compressing a complex hologram of the present invention may further include: (d) repeating steps (a) to (c) by recovering the assigned complex hologram from the complex index of the complex hologram in step (c) and adjusting a hyper parameter to minimize a difference (hereinafter, a loss) between an original complex hologram and the recovered complex hologram, in which the hyper parameter is a variable that adjusts at least one of a size and a shape of the unit region of the complex vector plane, and scaling for adjusting the distribution of the hologram.

In addition, in the coding method for compressing a complex hologram of the present invention, in step (d), the assigned complex index of the complex hologram may be inversely re-projected to the unit region of the complex vector plane, a complex vector representing the re-projected unit region may be extracted, and the complex hologram may be recovered with the extracted complex vector.

In addition, in the coding method for compressing a complex hologram of the present invention, in step (d), a complex vector having a representative value may be extracted from a range of the complex vector representing the re-projected unit region, and the complex hologram may be recovered with the extracted complex vector.

In addition, the coding method for compressing a complex hologram of the present invention may further include: (e) before step (f), collecting indexes (hereinafter, first indexes) of the unit region actually used when the projecting is performed in the complex vector plane to generate second indexes mapped one-to-one with the first indexes, in which the second indexes include a series of numbers, have a same number as the first indexes, and are reassigned by mapping the indexes of the complex index plane according to a corresponding mapping relationship.

In addition, in the coding method for compressing a complex hologram of the present invention, the complex hologram may include a real part and an imaginary part, and the complex vector may be a two-dimensional vector consisting of a real part and an imaginary part of a hologram.

In addition, in the coding method for compressing a complex hologram of the present invention, the complex hologram may be composed of a two-dimensional image and have a value of the real and imaginary parts on each coordinate of the two-dimensional image, and the index of the complex hologram may be composed of a two-dimensional image and have a value of the index assigned by the real and imaginary parts on each coordinate of the two-dimensional image.

In addition, in the coding method for compressing a complex hologram of the present invention, the complex hologram may include an amplitude and a phase, and the complex vector may be a two-dimensional vector consisting of an amplitude and a phase of a hologram.

In addition, in the coding method for compressing a complex hologram of the present invention, the complex hologram may be composed of a two-dimensional image and have a value of the amplitude and the phase on each coordinate of the two-dimensional image, and the index of the complex hologram may be composed of a two-dimensional image and have a value of the index assigned by the amplitude and the phase on each coordinate of the two-dimensional image.

In addition, in the coding method for compressing a complex hologram of the present invention, in step (f), the complex index of the complex hologram may be encoded by an image or a video codec.

In addition, the present invention provides a coding method for compressing a complex hologram, and the coding method includes: (g) receiving a complex index of the complex hologram encoded by the method of any one of claims 1 to 7; (h) decoding the complex index of the encoded complex hologram; and (i) inversely re-projecting the assigned complex index of the complex hologram to the unit region of the complex vector plane, extracting a complex vector representing the re-projected unit region, and recovering the complex hologram with the extracted complex vector.

In addition, the present invention provides a computer-readable recording medium on which a program for performing the coding method for compressing a complex hologram is recorded.

As described above, according to the coding method for compressing a complex hologram, the full-complex hologram is reconstructed into one piece of index information using the complex vector plane to code the full-complex hologram, such that the hologram can be efficiently compressed while preserving a relationship in the hologram between the real and imaginary parts (or amplitude and phase).

BRIEF DESCRIPTION OF THE DRAWINGS

FIG. 7 is an exemplary diagram of a non-uniform complex vector plane according to an embodiment of the present invention, in which (a) shows a non-uniform complex vector plane in the form of circles, (b) shows a non-uniform complex vector plane in the form of real-imaginary symmetric rectangle, and (c) shows a non-uniform complex vector plane in the form of real-imaginary asymmetric square.

FIG. 10 shows a pseudo code explaining steps for optimizing the complex vector plane according to an embodiment of the present invention.

DETAILED DESCRIPTION OF THE INVENTION

Figure 1:
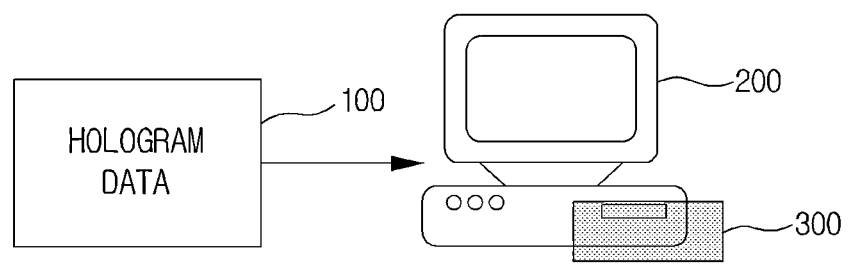
FIG. 1 is a diagram showing a configuration of an overall system for carrying out the present invention.

Hereinafter, embodiments of the invention will be described below in detail with reference to the accompanying drawings.

In the description of the embodiments, the same elements are denoted by the same reference numerals and will not be repeatedly described.

First, examples of a configuration of the entire system for carrying out the present invention will be described with reference to FIG. 1.

As shown in FIG. 1, a coding method for compressing a complex hologram according to the present invention may be implemented by a program system on a computer terminal 200 that receives hologram data 100 and compresses hologram components. That is, the coding method may be configured as a program, and installed and executed on the computer terminal 200. The program installed on the computer terminal 200 may operate with one program system or together with a coding system 300.

Meanwhile, as another embodiment, the coding method for compressing a complex hologram may be implemented by including one electronic circuit such as an application-specific integrated circuit (ASIC), in addition to including a program and operating in a general-purpose computer. Alternatively, the coding method may be developed as a dedicated computer terminal that exclusively processes only the compression of the hologram components. This will be referred to as the coding system 300. The coding method may be implemented in other possible forms.

Meanwhile, the hologram data 100 is data of the hologram components.

Next, a full-complex hologram used in the present invention will be described.

The full-complex hologram is mathematically expressed as Equation 1. On a hologram plane, interference between a reference wave and a reflected wave is calculated from object points, and interference patterns for all the object points are then accumulated. Equation 1 shows a CGH equation for generating a full-complex hologram. I (u, v) is an intensity at a coordinate (u, v) of a hologram plane, and A (x, y, z) is an intensity of the object point at an (x, y, z) coordinate. N is a number of object points, λ is a wavelength of a reference wave used for generating a hologram, and p is a size of the hologram and an object point, which are treated as the same value for convenience.

$$I(u,v) = \sum_{j}^{N} A_j(x,y,z) \exp\left(\frac{2\pi}{\lambda}\sqrt{(pu-px)^2 + (pv-py)^2 + z^2}\right) \quad \text{[Equation 1]}$$

The hologram in Equation 1 includes a real part and an imaginary part as shown in Equation 2 below.

$$I(u,v) = I_{Rs}(u,v) + iI_{Im}(u,v) \quad \text{[Equation 2]}$$

In addition, the complex hologram may be transformed into a complex form having an amplitude and a phase in Equations 3 and 4. That is, the complex holograms in Equations 1 and 2 may be transformed into an amplitude Am (u, v) and a phase Ph (u, v) using Equations 3 and 4.

$$Am(u,v) = \sqrt{I_{re}^2(u,v) + I_{Im}^2(u,v)} \quad \text{[Equation 3]}$$

$$Ph(u,v) = \tan^{-1} I_{Im}(u,v)/I_{re}(u,v) \quad \text{[Equation 4]}$$

Next, the coding method for compressing a complex hologram according to an embodiment of the present invention will be described with reference to FIGS. 2 and 3.

The coding method according to an embodiment of the present invention largely includes an encoding process for compressing the hologram and a decoding process for decoding the compressed hologram.

Figure 2:
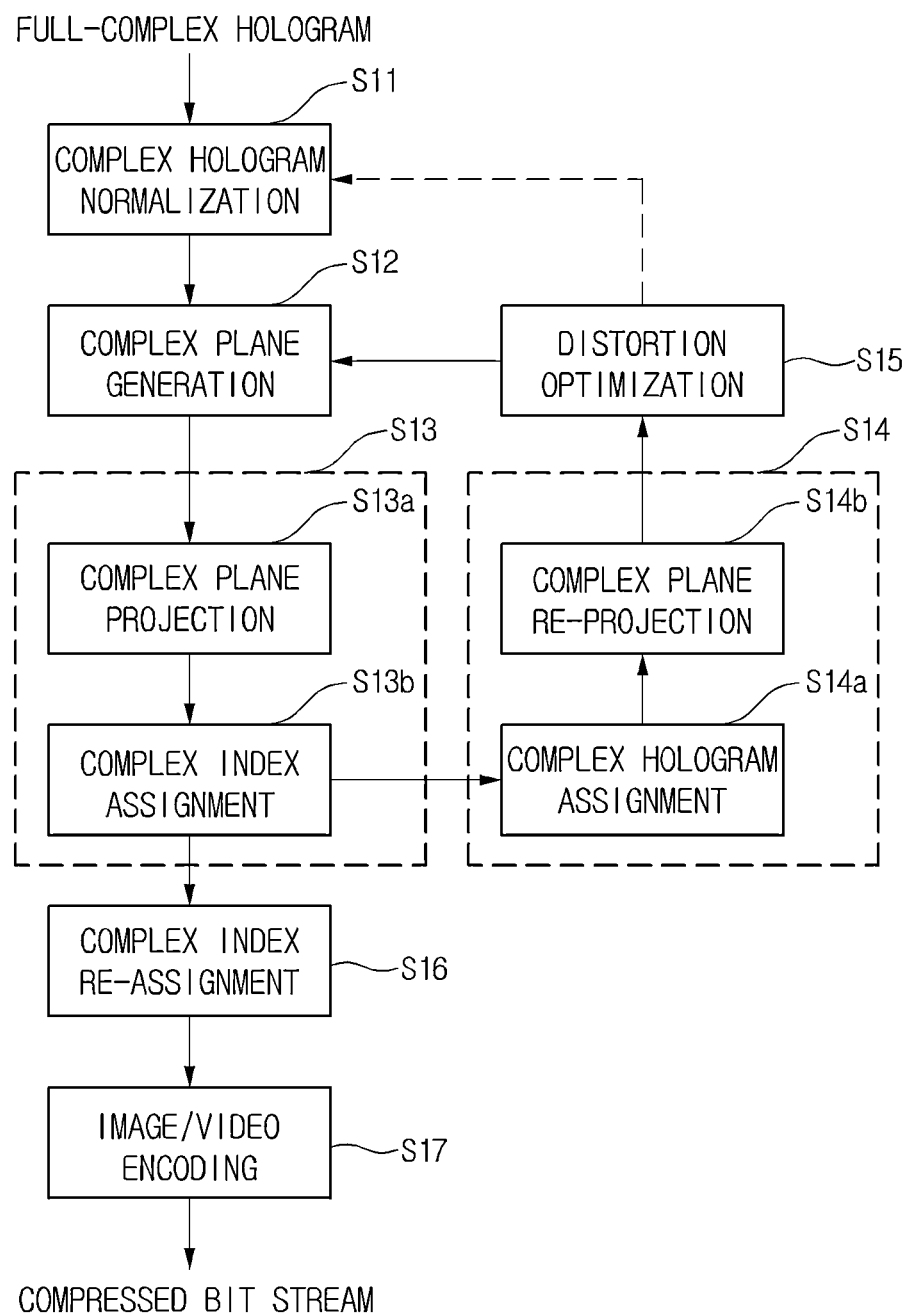
FIG. 2 is a flowchart for explaining an encoding process of a coding method for compressing a complex hologram according to an embodiment of the present invention.

As shown in FIG. 2, the encoding process according to an embodiment of the present invention includes the steps of complex hologram normalization (S11), complex hologram analysis and complex plane generation (S12), complex plane projection (S13a), complex index assignment (S13b), complex plane re-projection (S14a), complex hologram assignment (S14b), distortion optimization (S15), complex index re-assignment (S16), etc.

In this case, the steps of the complex plane projection (S13a) and the complex index assignment (S13b) constitute a hologram quantization step (S13), and the steps of the complex plane re-projection (S14a) and the complex hologram assignment (S14b) constitute a hologram de-quantization step (S14).

In addition, the encoding process finally further includes an image/video encoding step (S17), and a standard codec or a dedicated codec may be used.

Figure 3:
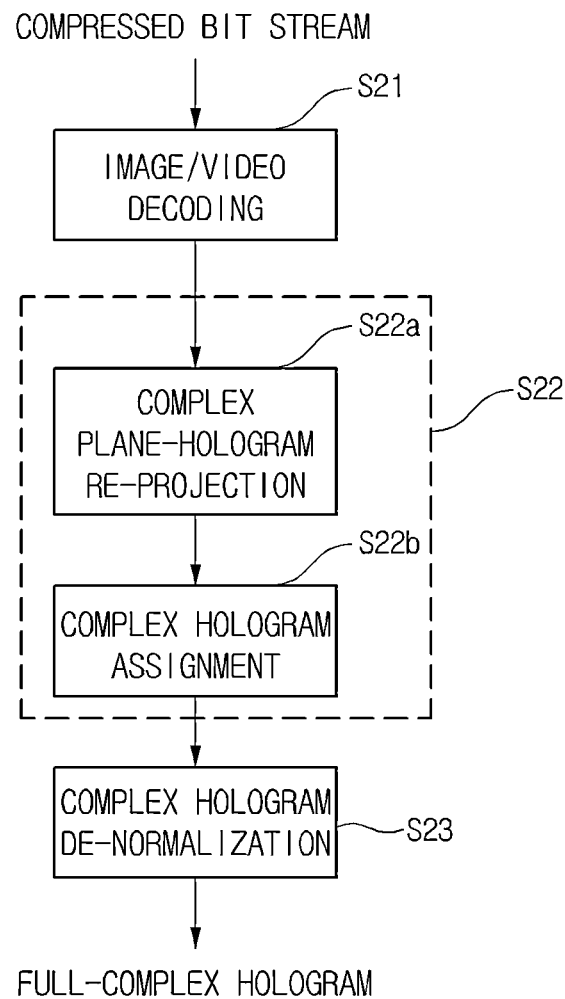
FIG. 3 is a flowchart for explaining a decoding process of the coding method for compressing a complex hologram according to an embodiment of the present invention.

Further, as shown in FIG. 3, the decoding process according to an embodiment of the present invention includes the steps of hologram de-quantization (S22), such as complex plane-hologram re-projection. (S22a) and complex hologram assignment (S22b), complex hologram de-normalization (S23), etc. An image/video decoding (S21) step is included herein.

That is, the decoding process of a decoder 340 according to the present invention is included in the encoding process of an encoder 330.

First, the full-complex hologram having various distributions is adjusted to have the same distribution through the normalization process (S11). The distribution of the complex hologram is analyzed to generate a complex plane (S12). The full-complex hologram is transformed into a complex index plane including a quantization index value by using the complex plane (S13). This process is defined as a complex hologram quantization step (S13).

The quantized complex hologram is recovered again through the de-quantization step (S14). After similarity between the original hologram and the recovered hologram is analyzed through the distortion optimization step (S15), a complex plane is regenerated based on the similarity and the subsequent process is repeated. When the similarly between the original hologram and the recovered hologram becomes very high, the repetition is stopped and the complex index re-assignment step (S16) is performed to leave only the minimized complex index and optimize the complex index plane. The resulting complex index plane is compressed using image and video compression codecs (anchor codec, JPEG2000, HEVC, VVC, dedicated codec, etc.) (S17) to generate a compressed bit stream.

Next, a recovering process is an inverse process of the compression process. First, the compressed bit stream is recovered using the image and video compression codecs (S21), and the complex hologram is then recovered through the complex hologram de-quantization step (S22). Finally, the complex hologram is re-normalized (S23) to finally recover a hologram having an original distribution.

Figure 4A:
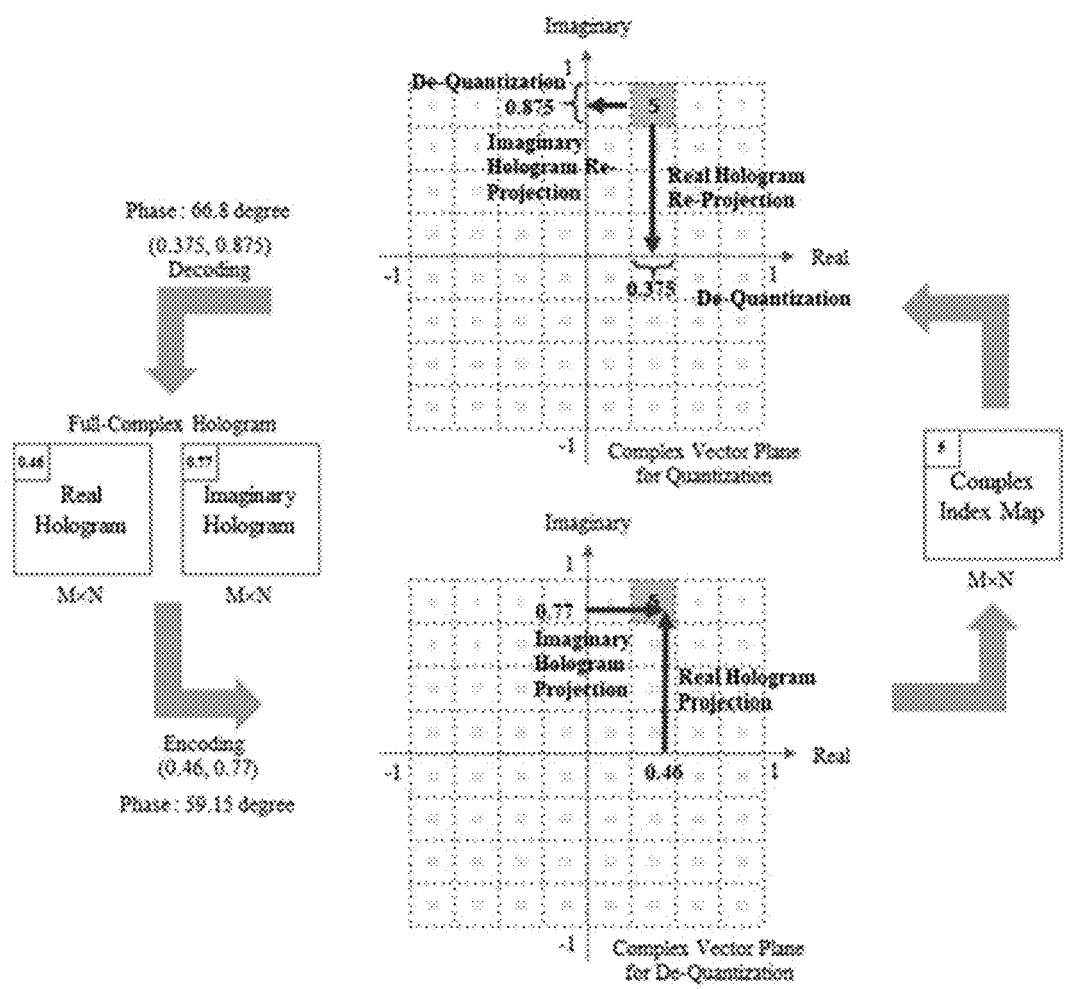
FIGS. 4a and 4b are schematic diagrams for summarizing main operations of the coding method for compressing a complex hologram according to an embodiment of the present invention.
Figure 4B:
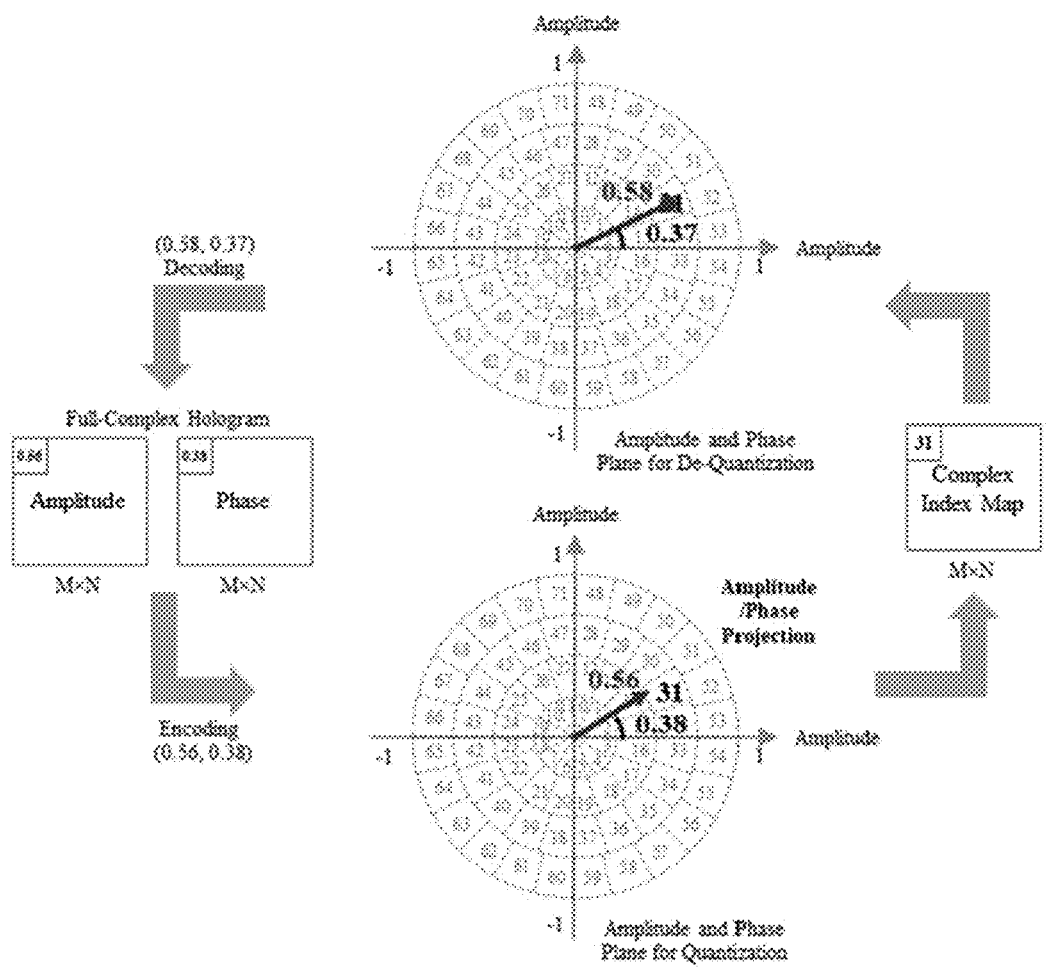

Next, a main operation of the coding method for compressing a complex hologram of the present invention will be described with reference to FIGS. 4a and 4b. FIGS. 4a and 4b schematically show a main operation of the coding method according to the present invention. FIG. 4a shows an operation for holograms of the real and imaginary parts, and FIG. 4b shows an operation for holograms of the amplitude and the phase.

The point of the present invention is to form a full-complex hologram including two frames of the real and imaginary parts (or amplitude and phase) as a complex plane of one frame having the same size. The most important operation in this case is re-projecting the hologram of the real and imaginary parts (or amplitude and phase) to one complex plane. The operation of re-projecting the hologram to the complex plane has three main effects.

First, a resolution of the input full-complex hologram may be reduced by half.

Second, a correlation between the real and imaginary parts (or amplitude and phase) of a full-complex hologram may be preserved.

Third, various region-based quantizations may be applied.

FIGS. 4a and 4b are composed of two main operations. The first operation is an encoding operation (process from bottom left to right) and the second operation is a decoding operation (process from top right to left).

In FIG. 4a, a value of a first pixel of the real part in the encoding operation is 0.46, and a value of the first pixel of the imaginary part is 0.77. A size of pixels of the real and imaginary parts is −1 to 1, which is the result of normalization. After defining a complex plane having a range of an x-axis ranging from −1 to 1 and a y-axis ranging from −1 to 1, one region is selected in the complex plane using the pixel values of 0.46 and 0.77. Currently, the region is assigned with an index of 5.

In FIG. 4b, a value of a first pixel of the amplitude in the encoding operation is 0.56, and a value of the first pixel of the phase is 0.38. The phase and the amplitude are defined in the normalized complex plane. That is, the size of the real and imaginary parts in the complex plane is normalized as −1 to 1, and the amplitude and the phase of the normalized complex plane are calculated and used. The normalized complex plane is defined as a plane having a range of an x-axis ranging from −1 to 1 and a y-axis ranging from −1 to 1. One region is selected in the normalized complex plane by using the amplitude of 0.56 and the phase of 0.38. Currently, the region is assigned with an index of 31.

That is, a two-dimensional vector may be created using two pixel values, and a position indicated by the vector is an index value created by the two pixels. In this way, the index created by a pair of pixels of the real and imaginary parts (or amplitude and phase) becomes one pixel in a complex index map. A rightmost rectangle in FIG. 4a or 4b corresponds to a hologram complex index map, and this information is compressed by the image and video codec. In the decoding process, after the pixels of the hologram complex index map are called one by one, the pixels of the original hologram are recovered using the complex plane.

Figure 5:
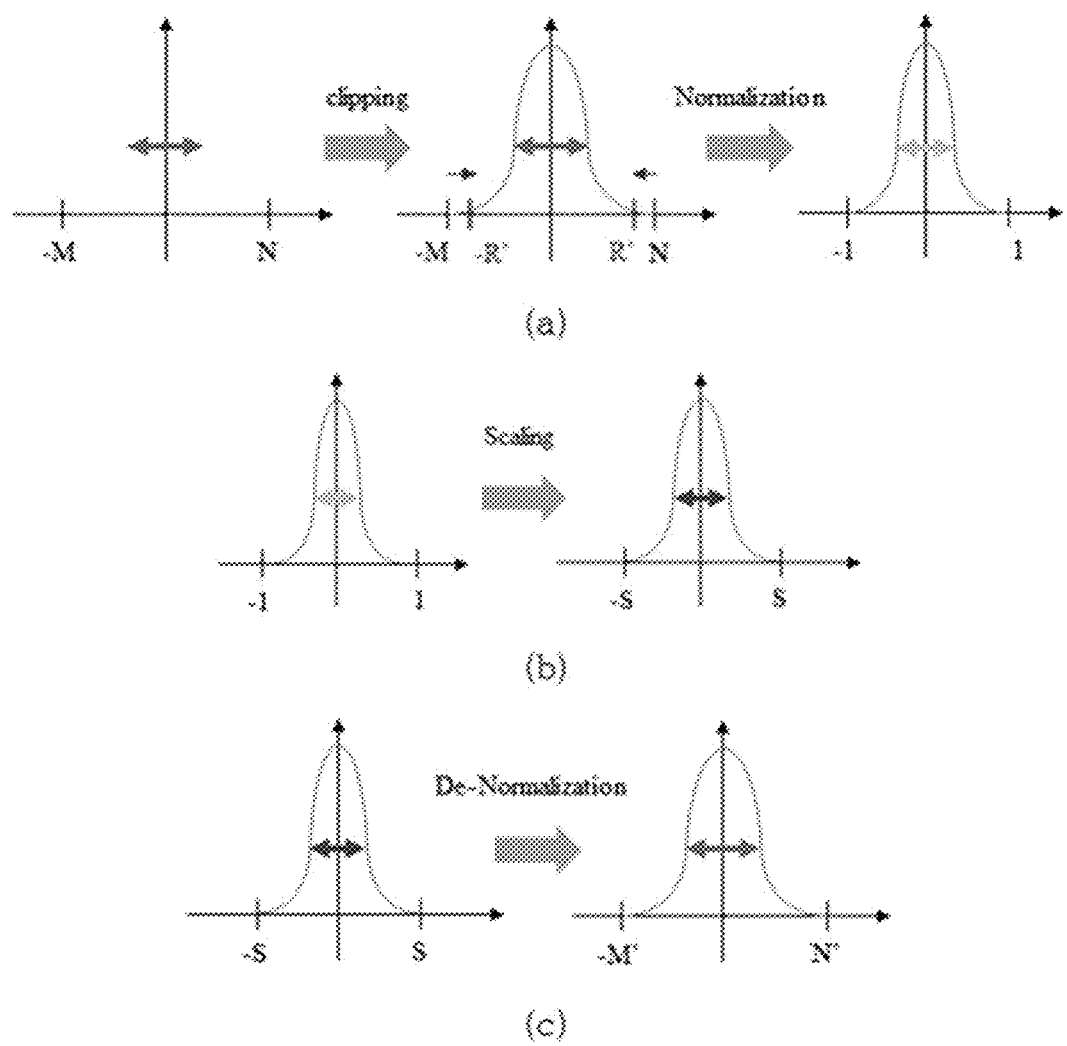
FIG. 5 is a schematic diagram of a process for adjusting a distribution of a hologram according to an embodiment of the present invention, in which (a) is a schematic diagram of a hologram normalization process, (b) is a schematic diagram of a scaling process, and (c) is a schematic diagram of a de-normalization process.

Next, the complex hologram normalization step (S11) and the de-normalization step (S23) will be described in more detail with reference to FIG. 5.

Unlike the two-dimensional image having only a specific fixed number of bits, the hologram may have a wide range of values (32-bit floating point, 64-bit floating point, 16-bit floating point, integer, etc.) depending on a method of generating the hologram. It is very difficult to process data having a wide range of values using a fixed algorithm. Therefore, a process for normalizing the input hologram into a data format having a predetermined range is essential.

The hologram normalization process largely includes two processes. The first process is a clipping process and the second process is a normalization process. When the distribution of the hologram is very wide, a predetermined region is clipped starting from a maximum value and a minimum value. Next, the entire data is projected into a range that the clipped region has a predetermined size (in FIG. 5, shown as −1 to 1).

In addition, preferably, a scaling operation is performed to adjust the distribution of the hologram in the normalization process (process for projecting the clipped region into a predetermined range). For example, the relative distribution of the hologram is adjusted to have a good compression efficiency by performing the scaling so that a range with high hologram distribution is widened and a range with low hologram distribution is narrowed.

The real and imaginary parts use the normalized value as it is, and the amplitude and the phase use the normalized amplitude and phase on the complex plane.

The hologram de-normalization process performs the same process in reverse. However, the clipped region may not be recovered to the same value.

Figure 6:
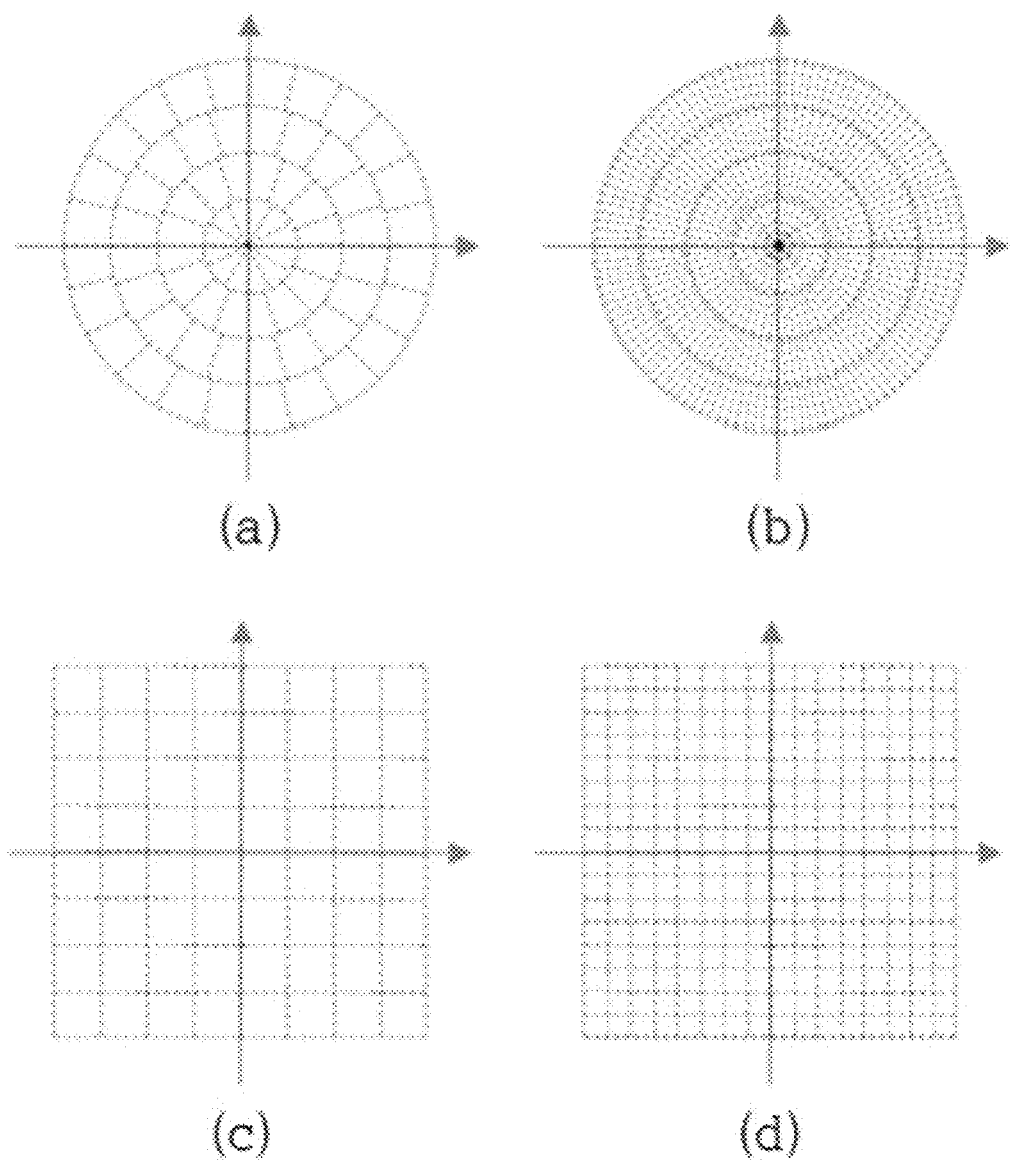
FIG. 6 is an exemplary diagram of a uniform complex vector plane according to an embodiment of the present invention, in which (a) shows a uniform complex vector plane in the form of low-density circles, (b) shows a uniform complex vector plane in the form of high-density circles, and (c) shows a uniform complex vector plane in the form of low-density squares, and (d) shows a uniform complex vector plane in the form of high-density squares.

Next, the complex vector plane generation step (S12) will be described in more detail with reference to FIGS. 6 and 7.

After the complex hologram is projected to the complex plane, the projected distribution is analyzed to generate a complex vector plane that may best represent the complex hologram.

The complex vector plane may have various shapes. The complex vector plane may have a shape of a rectangle, a circle, or any other shape.

The complex vector plane is divided into sub-regions, and one small unit region thereof is a spatial quantization unit of the hologram. The small region may be defined to have the same shape or area as in FIG. 6 depending on its position, or may be defined to have the different shape and area as in FIG. 7. That is, the small region may be formed uniformly or non-uniformly. In addition, the small region may be formed linearly or nonlinearly.

Preferably, the small region is divided by a unit of the corresponding shape depending on the shape of the complex hologram. That is, when the complex hologram includes the real and imaginary parts, the complex vector plane is divided by units of x and y. The unit regions are set by ranges of the x-axis and the y-axis, respectively. Further, when the complex hologram includes the amplitude and the phase, the complex vector plane is divided into unit regions based on a size and an angle. That is, the unit regions are set by ranges of the size and the angle, respectively. For example, any one unit region is divided by defining a size of 0.5 to 0.6 and an angle of 0.36 to 0.40.

Further, indexes (e.g., a series of numbers) that are distinguished from each other are given to each unit region of the complex vector plane. In particular, the indexes are preferably given as a series of numbers (e.g., a series of integers). For example, the index may be given by numbering each unit region with a serial number as shown in FIGS. 4a and 4b.

Figure 8A:
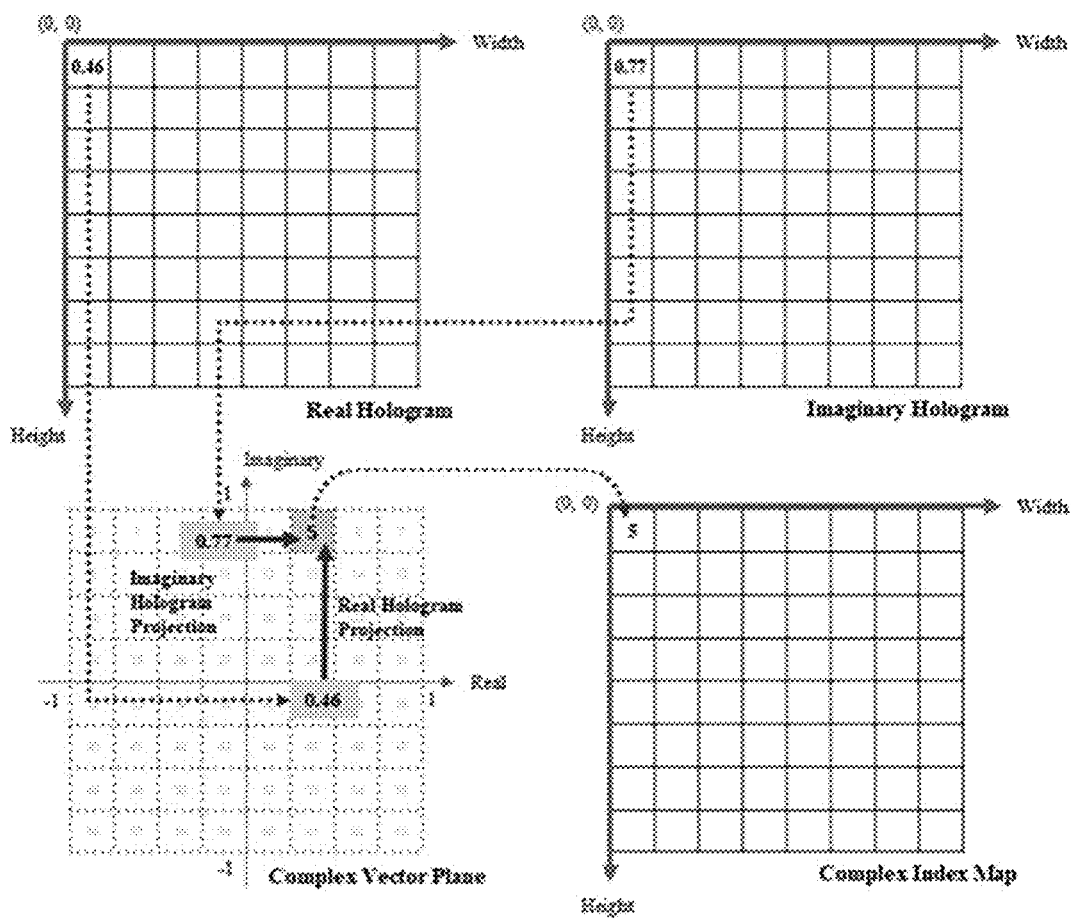
FIGS. 8a and 8b are exemplary diagrams schematically showing a complex hologram quantization process according to an embodiment of the present invention.

Next, the complex hologram quantization step (S13) will be described in more detail with reference to FIGS. 8a and 8b. FIG. 8a shows quantization for the real and imaginary parts, and FIG. 8b shows quantization for the amplitude and the phase.

The distribution of the complex hologram is analyzed to generate a complex vector plane, and then the quantization of the complex hologram is performed using the complex vector plane.

The complex hologram quantization step (S13) using the complex vector plane largely includes the complex vector plane projection step (S13a) and the complex index assignment step (S13b).

Figure 8B:
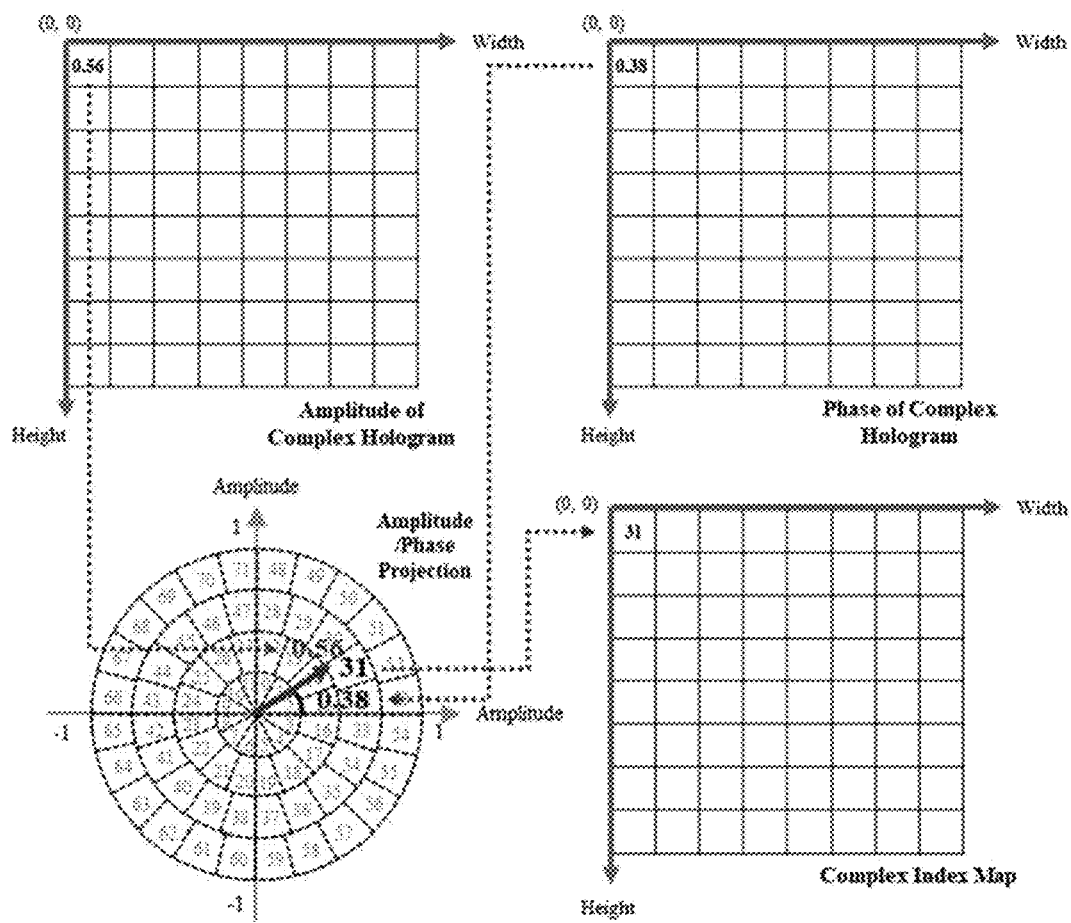

These two processes simultaneously shown in FIG. 8a or 8b.

As shown in FIG. 8a, a real hologram and an imaginary hologram constitute two axes of the complex vector plane. Two values at the spatially same position of the hologram pixel (two-dimensional coordinate) of the two-dimensional real and imaginary holograms become coordinates of the x-axis and the y-axis of the complex vector plane, respectively. A region (quantization unit) consisting of the two coordinates and including a two-dimensional coordinate (two-dimensional vector) in the form of a real number has one index. The index value is a value constituting the complex index plane. In addition, a coordinate of the index value for the plane is defined as a position (two-dimensional coordinate) of pixels of the real and imaginary holograms. As described above, the complex vector plane is divided into plural regions, and the region (or unit region) corresponds to a spatial quantization unit.

Further, as shown in FIG. 8b, the amplitude and the phase of the hologram constitute two axes of the complex vector plane. Two values at the spatially same position of the pixels (two-dimensional coordinate) for the two-dimensional amplitude and phase become coordinates of the amplitude and the angle of the complex vector plane, respectively. A two-dimensional vector in the form of a real number is formed based on the two components, and an index for a region indicated by the vector is selected. A quantization result for the two components is an index of the region indicated by the vector generated from the components.

Next, the hologram de-quantization steps (S14 and S22) will be described in more detail with reference to FIGS. 9a and 9b.

The hologram de-quantization process is the same as an inverse process of the hologram quantization process. The complex index planes are processed one by one in the order of two dimensional coordinates.

Figure 9A:
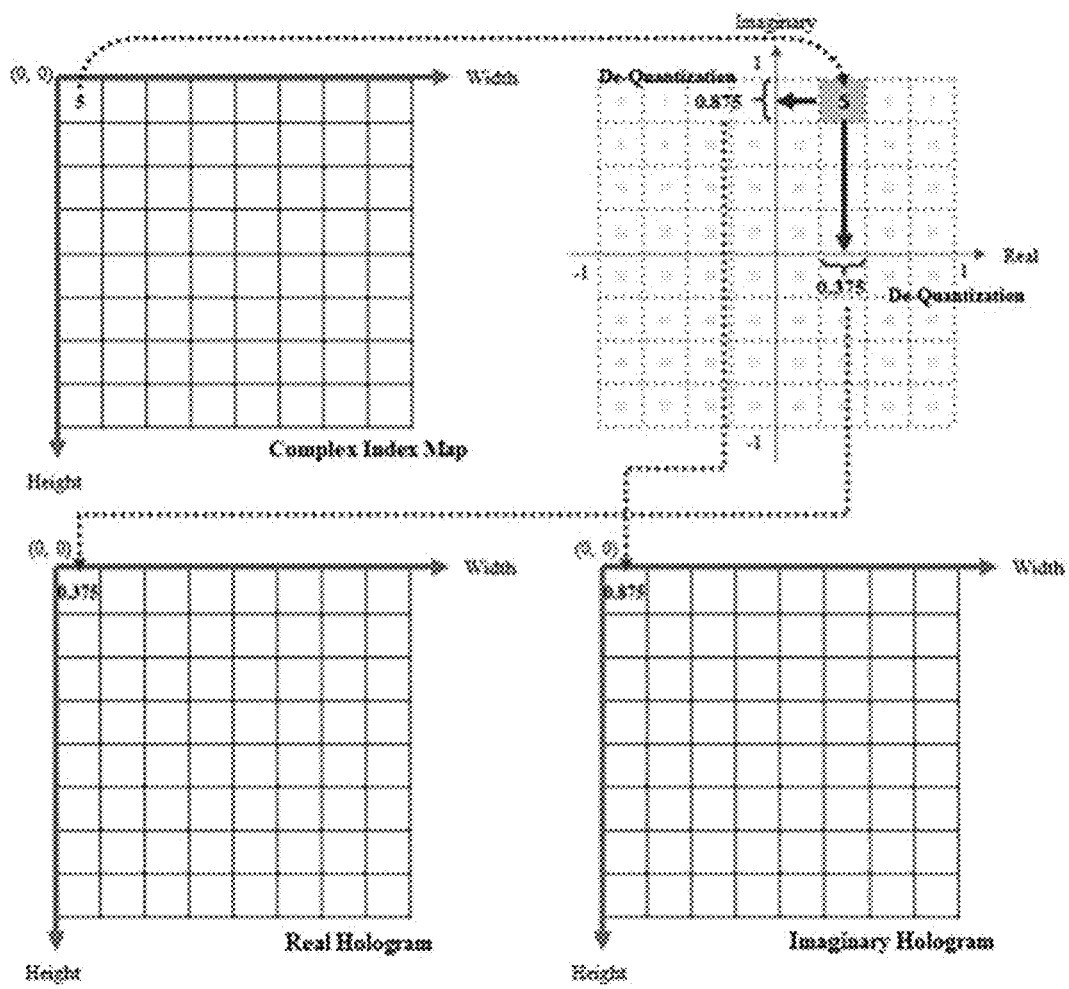
FIGS. 9a and 9b are exemplary diagrams schematically showing a complex hologram de-quantization process according to an embodiment of the present invention.
Figure 9B:
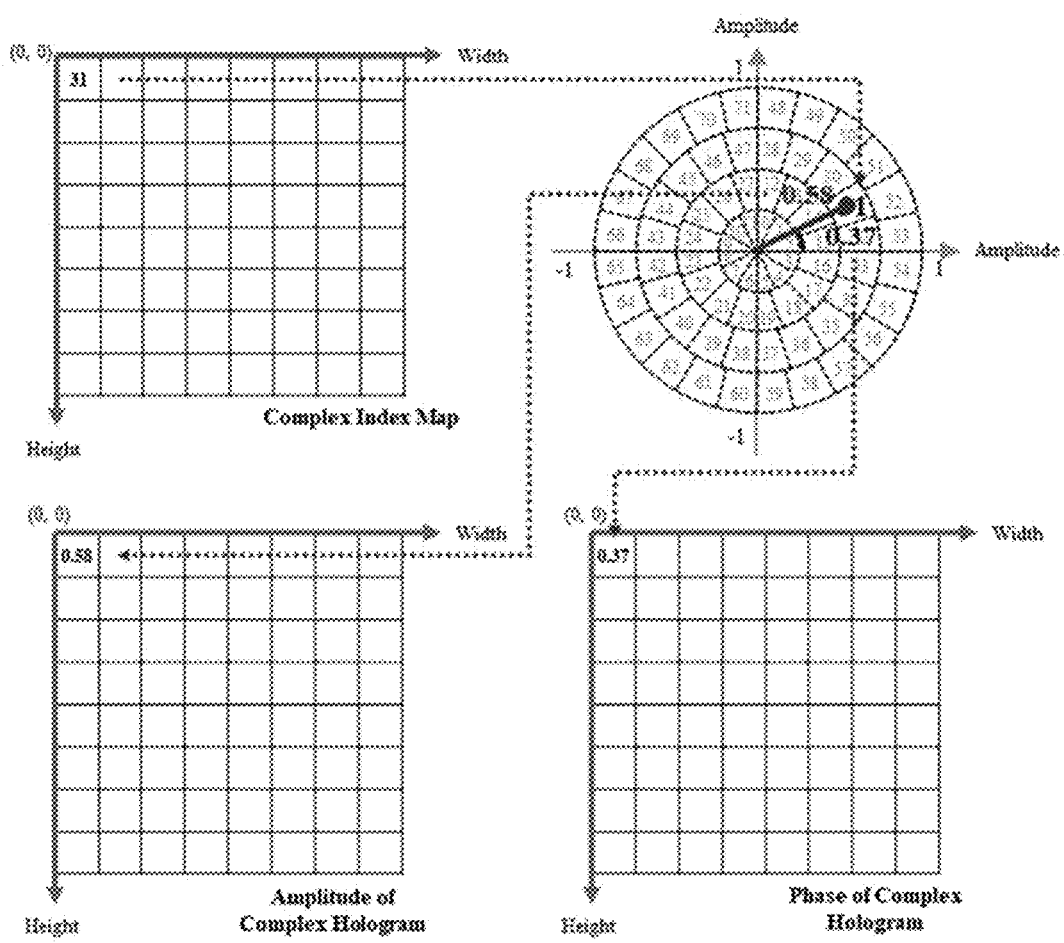

FIGS. 9a and 9b show the de-quantization processes, and respectively show the de-quantization processes corresponding to the FIGS. 8a and 8b.

As shown in FIG. 9a or 9b, the coordinate of the complex index plane is the same as a coordinate of a complex hologram to be recovered. Values forming the complex index plane are quantization indexes and indicate each region (or unit region) of the complex vector plane. After reading the values of the complex index plane one by one and confirming the index value, a two-dimensional vector for defining the corresponding region (or unit region) in the complex vector plane indicated by the index is calculated. Each value of the two-dimensional vector is a value of the real or imaginary part (or amplitude or phase).

That is, in FIG. 9a, a value for the x-axis of the two-dimensional coordinate (or two-dimensional vector) is a value of the real hologram, and a value for the y-axis is a value of the imaginary hologram. In addition, in FIG. 9b, a size and an angle of the two-dimensional vector are the amplitude and the phase of the hologram, respectively.

Preferably, in case of FIG. 9a, a median value of a range of the x-axis or y-axis corresponding to the unit region is extracted as the real/imaginary part of the corresponding hologram, or in case of FIG. 9b, a median value of a range of the amplitude or phase corresponding to the unit region is extracted as the amplitude/phase of the corresponding hologram. That is, preferably, a representative value of the complex vector corresponding to the unit region is set as a representative value (e.g., a median value, a start point value, an end point value, etc.) of a range of a corresponding vector value (a range of a vector value corresponding to the unit region).

Next, the distortion optimization step (S15) will be described in more detail with reference to FIGS. 10a and 10b. FIG. 10a relates to a hologram in the form of the real and imaginary parts, and FIG. 10b relates to a hologram in the form of the amplitude and the phase.

The hologram recovered through the hologram quantization and the de-quantization is compared with the original hologram to minimize the influence of the complex index plane on the quantization and recovery of the hologram.

That is, it is to repeatedly find a complex vector plane that may best represent the original hologram and minimize a loss of information on the original hologram through the quantization and de-quantization processes.

A process of the distortion optimization step (S15) is summarized in FIGS. 10a and 10b.

In a pseudo code of FIG. 10a, the full-complex hologram, the complex index plane, and de-quantized full-complex hologram are defined as $H_c(x, y)$, $I(x, y)$, and $H_c(x, y)$, respectively. In addition, quantization and de-quantization functions are defined as $Q(H_c, \theta)$ and $Q^{-1}(I, \theta)$, respectively. Transformation and inverse transformation functions into the complex vector plane are defined as $C(\theta)$ and $C^{-1}(\theta)$, respectively. In this case, θ corresponds to a hyper parameter for defining a shape of the complex vector plane, and a corresponds to a learning rate.

In a pseudo code of FIG. 10b, the hologram in the form of the amplitude and phase, the complex index plane, and the de-quantized hologram of the amplitude and phase are defined as $H_{AP}(x, y)$, $I(x, y)$, $H_{AP}(x, y)$, respectively. In addition, quantization and de-quantization functions are defined as $Q(H_{AP}, \theta)$ and $Q^{-1}(I, \theta)$, respectively. Transformation and inverse transformation functions into the complex vector plane are defined as $C(\theta)$ and $C^{-1}(\theta)$, respectively. In this case, e corresponds to a hyper parameter for defining a shape of the complex vector plane, and a corresponds to a learning rate.

Preferably, θ is a hyper parameter defining a unit region of the complex vector plane. That is, the hyper parameter is a parameter for adjusting the size and the shape of the unit region of the complex plane. For example, the size and the shape of the unit region of the vector plane may be adjusted by creating complex functions or selected by setting the size and the shape to plural types in advance. Alternatively, the size and the shape of the unit region of the vector plane may be used by mixing these methods.

More preferably, the hyper parameter θ may further include a scaling variable for adjusting the distribution of the hologram. In this case, the process is performed again from the complex hologram normalization step (S11).

As shown in FIG. 10a or 10b, first, a quantization process for generating a complex index plane using the complex vector plane and the hologram is performed (step1). Next, a de-quantization process for recovering the hologram using the complex index plane is performed again (step2). Next, a difference between the original hologram and the recovered hologram is calculated (step3), and the entire process is repeated (step 8) while updating a shape of the complex vector plane to minimize the difference (step4 to step7).

Next, the complex index re-assignment step (S16) will be described in more detail with reference to FIG. 11.

All regions of the complex vector plane may not be used. The complex vector plane may be partially used depending on the distribution of the complex hologram. In FIG. 11, a complex vector plane used in the entire complex vector plane is shown in blue.

Figure 11:
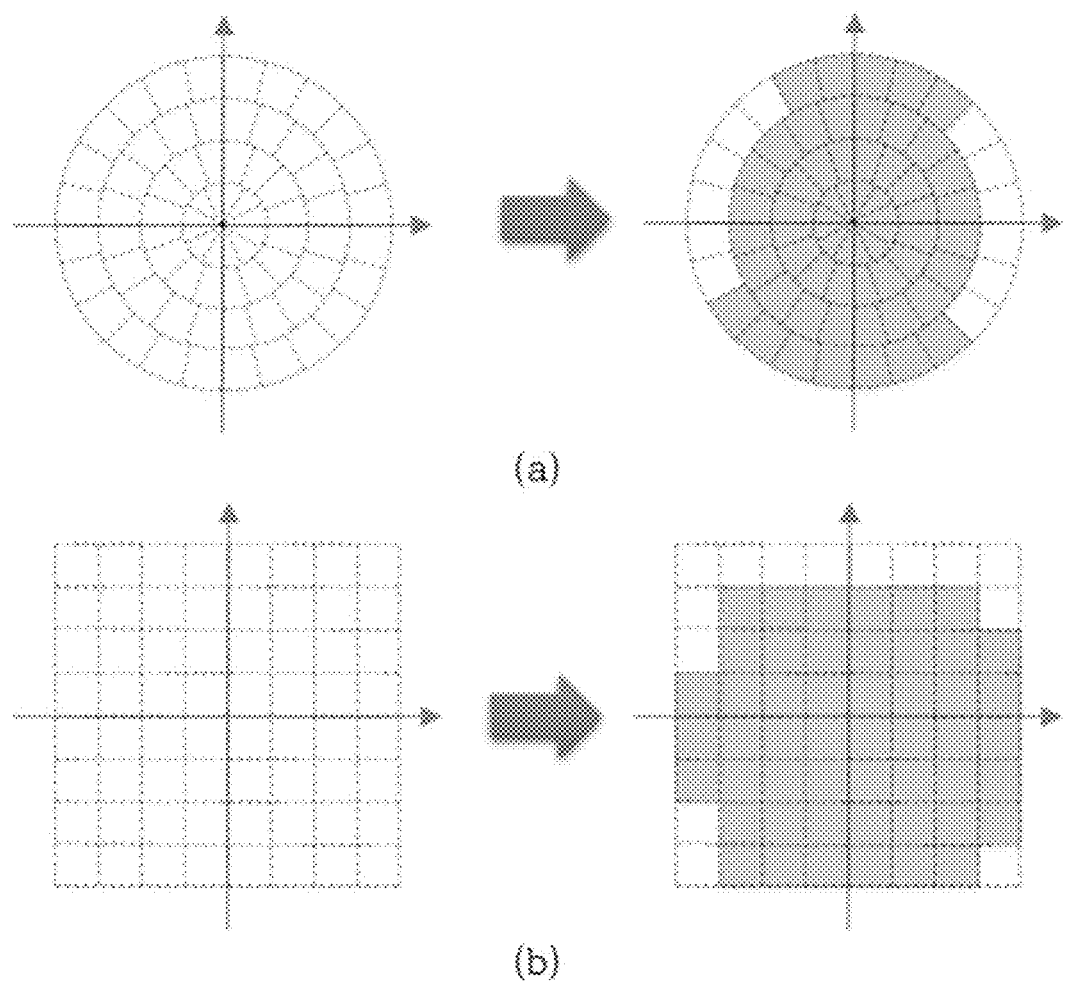
FIG. 11 is an exemplary diagram of a shape of the complex vector plane used according to an embodiment of the present invention.

As the region actually used in the complex vector plane is reduced as shown in FIG. 11, the number of assigned indexes is reduced. As the number of indexes is reduced, the complex index plane including the index values becomes monotonous. That is, a gradient of the complex index plane is lowered, such that the complex index plane may be compressed well.

That is, preferably, only indexes (hereinafter, first indexes) of the region actually used in the complex vector plane are collected to generate second indexes mapped one-to-one with the first indexes. The second indexes are indexes having the same type of index system as the first indexes, but only having the reduced number. That is, preferably, the second indexes include a series of numbers and are generated with the same number as the number of the first indexes. In addition, the index of the complex index plane is re-assigned according to such a mapping relationship (re-assignment mapping relationship). That is, the index of the complex index plane is re-assigned by mapping the index to an index of the second indexes.

For example, 100 (index: 0 to 99) unit regions of the complex vector plane are created, and 80 unit regions are actually used. In this case, it means that 80 indexes used are re-assigned by mapping the indexes to new indexes (0 to 79) again except for 20 unit areas that are not used. Because a range of data is reduced, a compression ratio of frequency transformation is better. That is, a rate of change of the data is lowered on average, such that a coefficient resulting from the frequency transformation is simplified.

Although the present invention invented by the present inventor has been described in detail with reference to the embodiments, the present invention is not limited to the above embodiments, and various modifications are possible without departing from the scope and spirit of the present invention.

What is claimed is:

1. A coding method for compressing a complex hologram, the coding method comprising:
   (a) normalizing the complex hologram by clipping a predetermined region thereof and projecting the clipped region into a range having a predetermined size;
   (b) creating a complex vector plane divided into unit regions, and giving an index to each unit region of the complex vector plane;
   (c) mapping the complex hologram including two frames of two parts to a complex index map, wherein the mapping includes:
      projecting two pixel values of the two frames to the complex vector plane by regarding the two pixel values of the two frames as a first complex vector; and
      assigning the index given to each unit region of the complex vector plane as a complex index of the complex index map; and
   (f) encoding the complex index map assigned with the complex index.

2. The coding method of claim 1, wherein in the step (a), when the clipped region is projected into the range having the predetermined size, a scaling operation is further performed for adjusting a distribution of the complex hologram.

3. The coding method of claim 1, wherein in the step (b), the index is given to each unit region of the complex vector plane as numbers that are-distinguished from each other.

4. The coding method of claim 3, wherein in the step (b), the index is given to each unit region of the complex vector plane as a series of numbers in each unit region.

5. The coding method of claim 1, further comprising:
   (d) repeating the steps (b) and (c) by recovering the complex hologram from the assigned complex index of the complex hologram in the step (c), and adjusting a parameter to minimize a difference between an original complex hologram and the recovered complex hologram, wherein the parameter is a variable that adjusts at least one of a size or a shape of each unit region of the complex vector plane.

6. The coding method of claim 2, further comprising:
   (d) repeating the steps (a) to (c) by recovering the complex hologram from the assigned complex index of the complex hologram in the step (c), and adjusting a parameter to minimize a difference between an original complex hologram and the recovered complex hologram, wherein the parameter is a variable that adjusts at least one of a size or a shape of each unit region of the complex vector plane.

7. The coding method of claim 5, wherein in the step (d), the assigned complex index of the complex hologram is inversely re-projected to each unit region of the complex vector plane, a second complex vector representing the re-projected unit region is extracted, and the complex hologram is recovered based on the second extracted complex vector.

8. The coding method of claim 7, wherein in the step (d), a third complex vector having a representative value is extracted from a range of the second complex vector representing the re-projected unit region, and the complex hologram is recovered based on the third extracted complex vector.

9. The coding method of claim 1, further comprising:
   (e) before the step (f), collecting first indexes of each unit region actually used when the projecting is performed in the complex vector plane, and generating second indexes mapped one-to-one with the first indexes, wherein the second indexes include a series of numbers, have a same number as the first indexes, and are reassigned by mapping the first indexes of the complex index map according to a corresponding mapping relationship.

10. The coding method of according to claim 1, wherein the complex hologram includes a real part and an imaginary part, and the first complex vector is a two-dimensional vector comprising the real part and the imaginary part of the complex hologram.

11. The coding method of according to claim 1, wherein the complex hologram includes an amplitude part and a phase part, and the first complex vector is a two-dimensional vector comprising the amplitude part and the phase part of the complex hologram.

12. The coding method according to claim 1, further comprising:
   (g) receiving the encoded complex index map of the complex hologram;
   (h) decoding the encoded complex index map; and
   (i) inversely re-projecting the decoded complex index map of the complex hologram to one of the unit regions of the complex vector plane, extracting a second complex vector representing the re-projected unit region, and recovering the two parts of the complex hologram based on the second extracted complex vector.

13. A non-transitory computer-readable recording medium storing a computer program that, when executed by a computer processor, causes the computer processor to perform a coding method for compressing a complex hologram, the coding method comprising:
   (a) normalizing the complex hologram by clipping a predetermined region thereof and projecting the clipped region into a range having a predetermined size;
   (b) creating a complex vector plane divided into unit regions, and giving an index to each unit region of the complex vector plane;
   (c) mapping the complex hologram including two frames of two parts to a complex index map, wherein the mapping includes:

projecting two pixel values of the two frames to the complex vector plane by regarding the two pixel values of the two frames as a first complex vector; and assigning the index given to each unit region of the complex vector plane as a complex index of the complex index map; and (f) encoding the complex index map assigned with the complex index.

* * * * *